(12) United States Patent
Lee et al.

(10) Patent No.: US 9,860,353 B2
(45) Date of Patent: Jan. 2, 2018

(54) FLEXIBLE DISPLAY APPARATUS HAVING A ROLLABLE DISPLAY PANEL

(71) Applicant: Samsung Display Co., Ltd., Yongin, Gyeonggi-Do (KR)

(72) Inventors: Junghun Lee, Yongin (KR); Younjoon Kim, Yongin (KR); Kyunghyun Baek, Yongin (KR); Sangjo Lee, Yongin (KR); Jangdoo Lee, Yongin (KR); Jusuck Lee, Yongin (KR); Kyungmin Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 134 days.

(21) Appl. No.: 14/676,193

(22) Filed: Apr. 1, 2015

(65) Prior Publication Data

US 2016/0120022 A1    Apr. 28, 2016

(30) Foreign Application Priority Data

Oct. 23, 2014    (KR) .................. 10-2014-0144280

(51) Int. Cl.
*H05K 1/02*    (2006.01)
*H04M 1/02*    (2006.01)
*G06F 1/16*    (2006.01)

(52) U.S. Cl.
CPC ........ *H04M 1/0268* (2013.01); *G06F 1/1652* (2013.01)

(58) Field of Classification Search
CPC .......................... H04M 1/0268; G06F 1/1652
USPC .......................................................... 361/749
See application file for complete search history.

(56) References Cited

U.S. PATENT DOCUMENTS

| | | | |
|---|---|---|---|
| 6,940,497 B2 | 9/2005 | Vincent et al. | |
| 7,310,050 B2 * | 12/2007 | Yeh ........................ | G06F 1/1624 340/815.4 |
| 7,426,107 B2 * | 9/2008 | Yeh ........................ | G06F 1/1626 340/815.4 |
| 7,636,085 B2 | 12/2009 | Yang | |
| 2001/0008582 A1 * | 7/2001 | Sato .................. | G02F 1/133348 396/429 |
| 2006/0007368 A1 | 1/2006 | Slikkerveer et al. | |
| 2007/0216639 A1 | 9/2007 | LaFarre et al. | |
| 2008/0211733 A1 | 9/2008 | Huitema | |
| 2010/0026634 A1 * | 2/2010 | Tsai ...................... | G09G 3/3433 345/173 |

(Continued)

FOREIGN PATENT DOCUMENTS

| | | |
|---|---|---|
| EP | 2204971 A | 7/2010 |
| JP | 2008-500593 A | 1/2008 |

(Continued)

*Primary Examiner* — Tuan T Dinh
*Assistant Examiner* — Rockshana Chowdhury
(74) *Attorney, Agent, or Firm* — H.C. Park & Associates, PLC

(57) ABSTRACT

A flexible display apparatus having a rollable display panel includes a case having an opening portion formed therein, a first roller rotatably provided inside the case, a display portion provided on the first roller to be wound around the first roller or released from the first roller, and a rotatable guide portion provided inside the case to guide the display portion by radially bending the display portion at least one time during a movement of the display portion.

21 Claims, 9 Drawing Sheets

(56) References Cited

U.S. PATENT DOCUMENTS

| | | |
|---|---|---|
| 2010/0033435 A1 | 2/2010 | Huitema |
| 2010/0177020 A1 | 7/2010 | Bemelmans et al. |
| 2011/0151630 A1* | 6/2011 | Nara .................. G03F 7/2035 |
| | | 438/158 |
| 2012/0050075 A1 | 3/2012 | Salmon |
| 2012/0243207 A1* | 9/2012 | Wang .................. G09F 9/301 |
| | | 362/97.1 |
| 2012/0264489 A1* | 10/2012 | Choi .................. H04M 1/0216 |
| | | 455/566 |
| 2013/0002572 A1* | 1/2013 | Jin .................. G02F 1/133305 |
| | | 345/173 |
| 2013/0058063 A1* | 3/2013 | O'Brien .................. G06F 1/1624 |
| | | 361/807 |
| 2013/0203469 A1* | 8/2013 | Cho .................. G06F 3/04886 |
| | | 455/566 |
| 2014/0146163 A1* | 5/2014 | Woo .................. G01N 21/8901 |
| | | 348/88 |
| 2014/0194165 A1 | 7/2014 | Hwang |
| 2014/0218375 A1 | 8/2014 | Kim |
| 2015/0009636 A1 | 1/2015 | Jeong et al. |

FOREIGN PATENT DOCUMENTS

| | | |
|---|---|---|
| JP | 2013-127539 A | 6/2013 |
| KR | 10-0818170 B1 | 3/2008 |

* cited by examiner

FLEXIBLE DISPLAY APPARATUS HAVING A ROLLABLE DISPLAY PANEL

CLAIM OF PRIORITY

This application makes reference to, incorporates the same herein, and claims all benefits accruing under 35 U.S.C. §119 from an application earlier filed in the Korean Intellectual Property Office on the 23, Oct. 2014 and there duly assigned Serial No. 10-2014-0144280.

BACKGROUND OF THE INVENTION

Field of the Invention

One or more embodiments of the present inventive concept relate to a display apparatus, and more particularly, to a flexible display apparatus having a rollable display panel.

Description of the Related Art

Portable electronic apparatuses are widely used and include compact electronic apparatuses such as mobile phones and tablet personal computers (PCs).

To support various functions, a portable electronic apparatus includes a panel portion that provides a user with visual information such as an image or video. Recently, as other parts for driving the panel portion have been minimized, the importance of the panel portion in electronic apparatuses has gradually increased. A structure to bend the panel portion by a predetermined angle in a flat state is under development.

The panel portion may be manufactured and used in a variety of shapes to be easily carried. In particular, various structures are being introduced including a structure in which a panel portion, if it is flexible, may be wound or released so as to be inserted into or drawn out of a case.

SUMMARY OF THE INVENTION

One or more embodiments of the present inventive concept include a display apparatus.

Additional aspects will be set forth in part in the description which follows and, in part, will be apparent from the description, or may be learned by practice of the presented embodiments.

According to one or more embodiments of the present inventive concept, a display apparatus includes a case having an opening portion formed therein, a first roller rotatably provided inside the case, a display portion provided on the first roller to be wound around the first roller or released from the first roller, and a rotatable guide portion provided inside the case to guide the display portion by radially bending the display portion at least one time during a movement of the display portion.

The display apparatus may further include a handle portion that is connected to an end portion of the display portion and opens and closes the opening portion of the case.

The display apparatus may further include a second roller that is provided inside the case to be adjacent to the opening portion and supports the display portion when the display portion is drawn from or inserted into the case.

The display portion may include a dummy portion that is connected to the first roller and is wound around or released from the first roller, and a panel portion that is connected to the dummy portion and is guided by the rotatable guide portion to be drawn from or inserted into the case.

The rotatable guide portion may include a guide gear portion that is partially inserted in the display portion to guide the display portion during the movement of the display portion.

The guide gear portion may include a first gear that is arranged at a lateral side of the display portion, a rotary shaft connected to the first gear, and a second gear that is arranged at the other lateral side of the display portion and is provided on the rotary shaft to face the first gear.

An insertion groove or insertion hole into which at least one gear tooth of the first gear and the second gear is inserted may be formed at at least one lateral side of the display portion.

The rotatable guide portion may be provided in a multiple number and the plurality of rotatable guide portions may be arranged to be separated from each other and to be misaligned with respect to each other in a lengthwise direction of the case.

The rotatable guide portion may be provided in a multiple number and the rotatable guide portions may radially bend the display portion to be parallel to a lengthwise direction of the case.

The rotatable guide portion may be provided in a multiple number and each of the rotatable guide portions may include a first rotatable guide portion that radially bends the display portion, and a second rotatable guide portion that is arranged at a more inner position in the case than the first rotatable guide portion with respect to a traveling direction of the display portion and radially bends the display portion.

The first rotatable guide portion and the second rotatable guide portion may be arranged at different heights inside the case.

The rotatable guide portion may be provided in a multiple number and each rotatable guide portion may be arranged at each corner of the case and may radially bend the display portion along an inner surface of the case The rotatable guide portion may include a guide roller portion that contacts the display portion and guides the display portion during the movement of the display portion.

The guide roller portion may include a first guide roller portion that contacts the display portion, and a second guide roller portion that is arranged to face the first guide roller portion and contacts the display portion.

The guide roller portion may include a first guide roller that is arranged at a lateral side of the display portion, a rotary shaft that is connected to the first guide roller, and a second guide roller that is arranged at the other lateral side of the display portion and is provided on the rotary shaft to face the first guide roller.

The display portion may be flexible.

The display apparatus may further include an elastic portion that is provided on the first roller to provide a restoration force to the first roller when the display portion is released.

The display apparatus may further include a support portion that is provided to be capable of being inserted in or drawn from the case and may support a part of the display portion when the display portion is drawn from the case.

The display portion may include a substrate, a display unit that is formed on the substrate, a thin film encapsulation layer formed on the display unit, and a protection film that is provided on at least one of a rear surface of the substrate and an upper surface of the thin film encapsulation layer.

The first roller may include a first roller body portion, and a first insulating portion that is provided on an outer surface of the first roller body portion and is formed of an insulating material.

These general and specific embodiments may be implemented by using a system, a method, a computer program, or a combination thereof.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
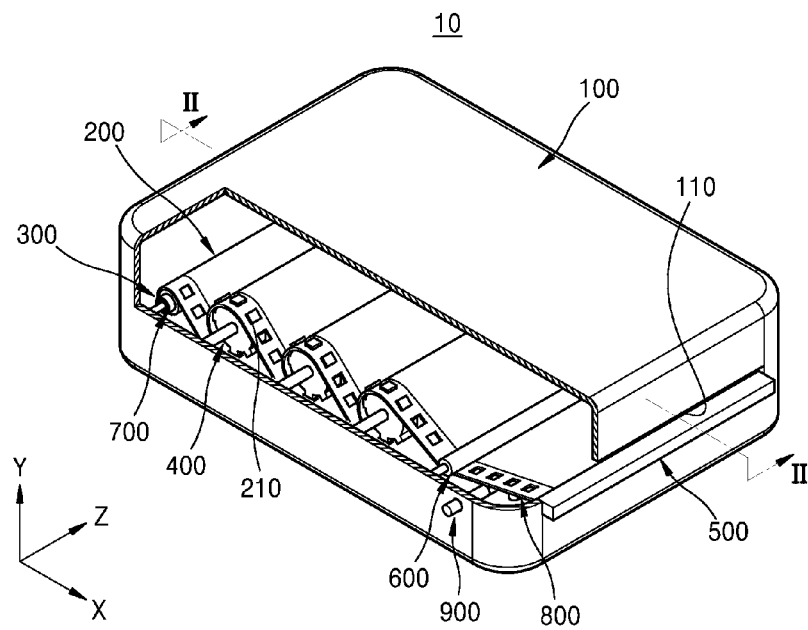
FIG. 1 is a conceptual view of a display apparatus according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms such as "first" and "second" are used herein merely to describe a variety of constituent elements, but the constituent elements are not limited by the terms. Such terms are used only for the purpose of distinguishing one constituent element from another constituent element.

Thus, an expression used in a singular form in the present specification also includes the expression in its plural form unless clearly specified otherwise in context.

When a part may "include" a certain constituent element, unless specified otherwise, it may not be construed to exclude another constituent element but may be construed to further include other constituent elements.

In the following description, when a layer, an area, and a constituent element is described to exist on or above another layer, the part may exist directly on the other part or another layer, area, or constituent element may be interposed therebetween.

Sizes of components in the drawings may be exaggerated for convenience of explanation. In other words, since sizes and thicknesses of components in the drawings are arbitrarily illustrated for convenience of explanation, the following embodiments are not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Figure 2:
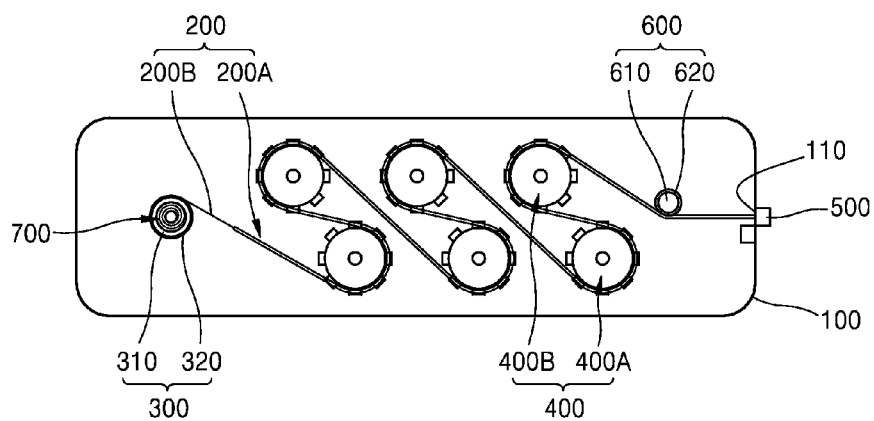
FIG. 2 is a cross-sectional view taken along a line II-II of FIG. 1.
Figure 3:
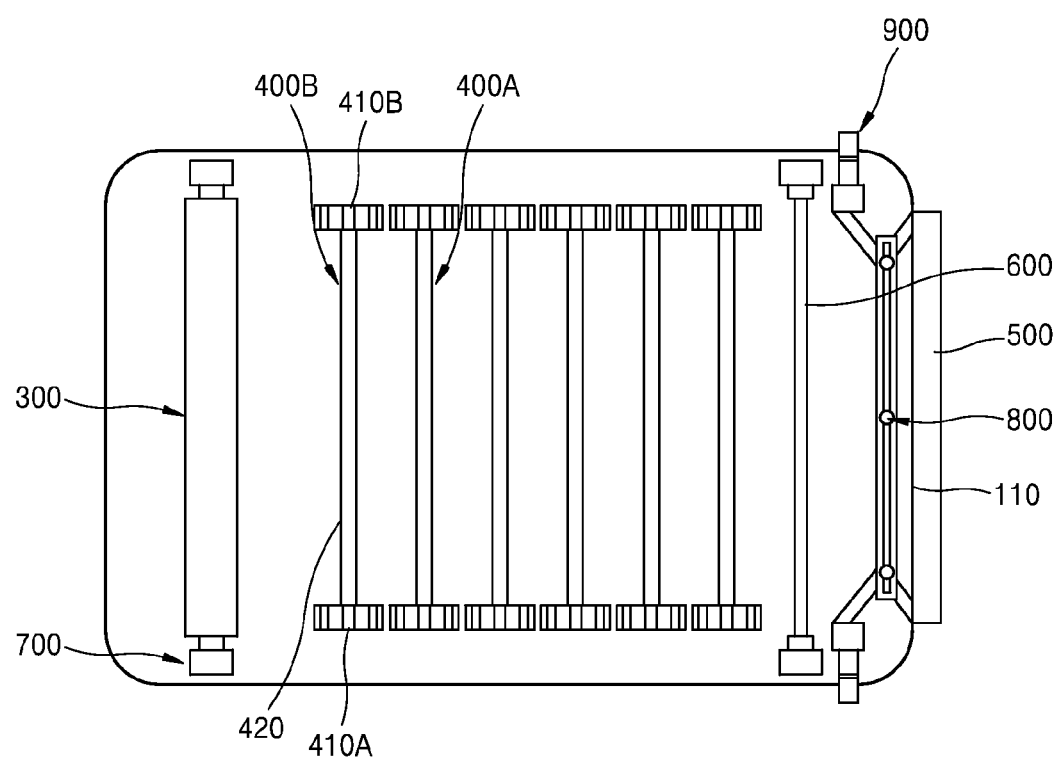
FIG. 3 is a plan view illustrating a part of the display apparatus of FIG. 1.
Figure 4A:
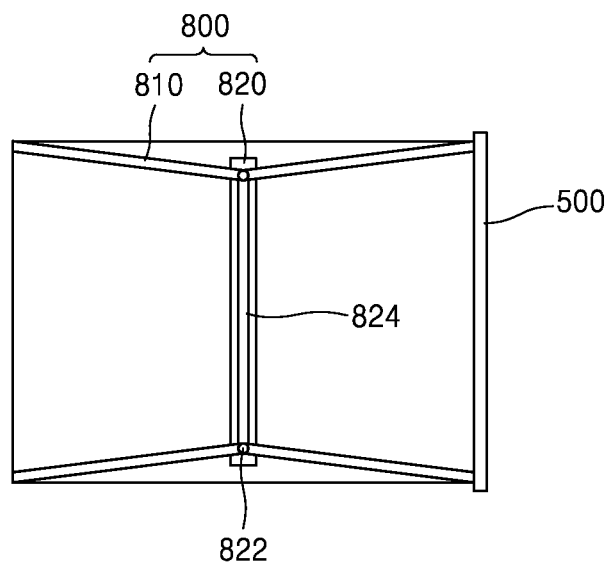
FIGS. 4A, 4B, and 4C are conceptual views illustrating a support portion of FIG. 3.
Figure 4B:
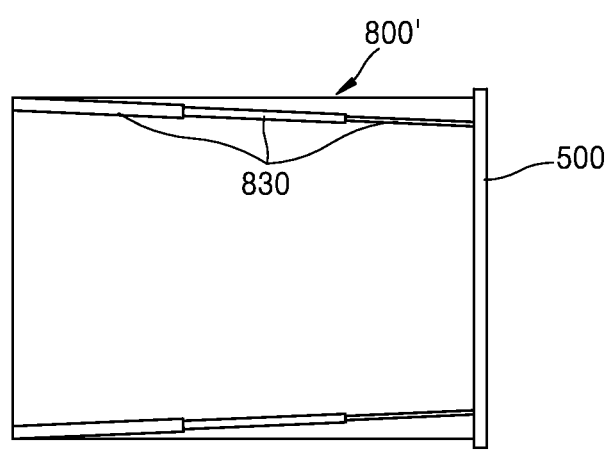
Figure 4C:
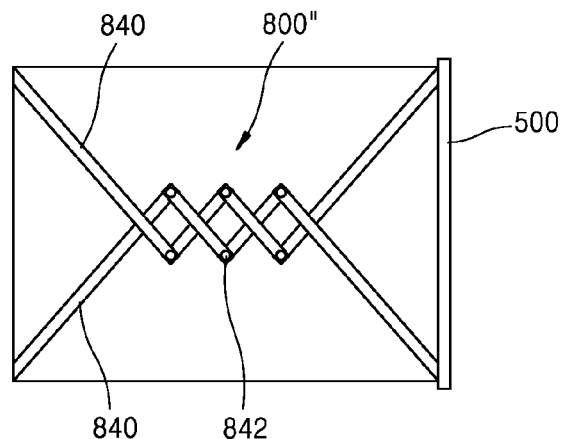
Figure 5:
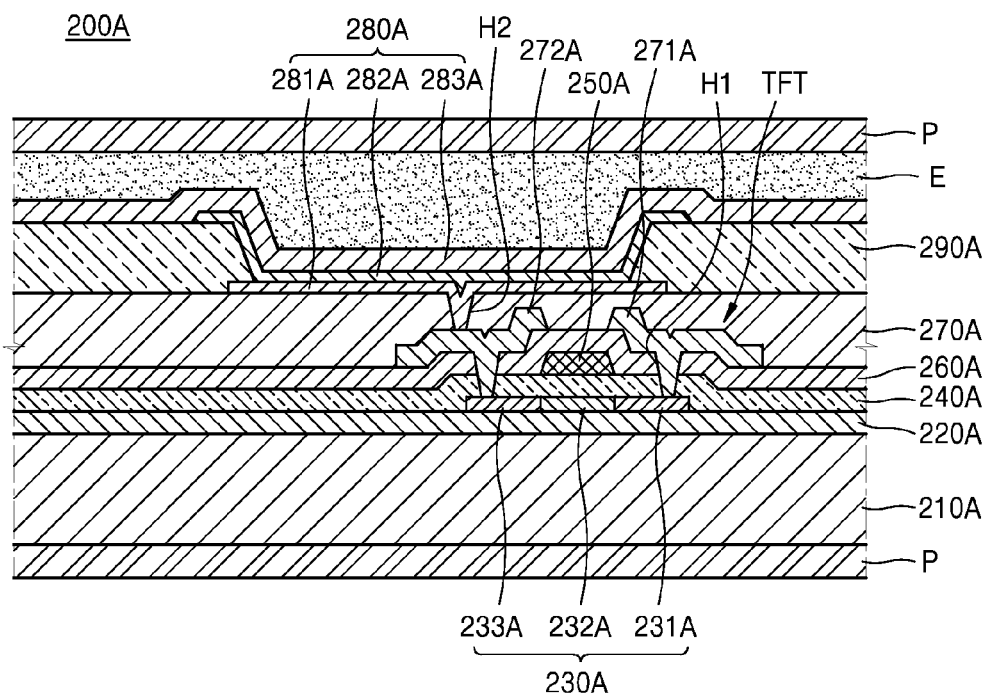
FIG. 5 is a cross-sectional view illustrating a panel portion of FIG. 1.

FIG. 1 is a conceptual view of a display apparatus 10 according to an exemplary embodiment. FIG. 2 is a cross-sectional view taken along a line II-II of FIG. 1. FIG. 3 is a plan view illustrating a part of the display apparatus of FIG. 1. FIGS. 4A, 4B, and 4C are conceptual views illustrating a support portion of FIG. 3. FIG. 5 is a cross-sectional view illustrating a panel portion of FIG. 1.

Referring to FIGS. 1 to 5, the display apparatus 10 may include a case 100, a display portion 200, a first roller 300, a guide portion 400, a handle portion 500, a second roller 600, an elastic portion 700, and a support portion 800.

The case 100 has a space inside and an opening portion 110 may be formed in one side of the case 100. The opening portion 110 may connect the inside and outside of the case 100, through which a part of the display portion 200 may be drawn out of or inserted in the case 100. Also, the opening portion 110 may be opened or closed by the handle portion 500. For example, when a user holds and pulls the handle portion 500, the handle portion 500 may open the opening portion 110. In contrast, when the user releases the handle portion 500, the handle portion 500 may be moved with the display portion 200 toward the case 100, thereby closing the opening portion 110.

The handle portion 500 may be formed of a variety of materials. For example, the handle portion 500 may be formed of the same material as that of the case 100 or may be formed of a flexible material. In addition, the handle portion 500 may be formed to be held by the user. For example, a finger groove through which a finger of the user is inserted may be formed or another member may be attached to the handle portion 500.

Referring to FIG. 2, the display portion 200 may include a dummy portion 200B and the panel portion 200A. The display portion 200 may be formed to be flexible. In particular, the display portion 200 may include any structure having a shape that may be variable such as an electronic paper (e-paper) or an organic light-emitting display. However, in the following description, a case in which the display portion 200 is an organic light-emitting display is mainly discussed for convenience of explanation.

The dummy portion 200B and the panel portion 200A may share one substrate 210A (FIG. 5). Also, the dummy portion 200B does not display an image to the outside, whereas the panel portion 200A may display an image to the outside.

The dummy portion 200B may be in a state in which a protection film P (FIG. 5) is attached on the substrate 210A. The protection film P may be attached on a rear surface of an upper surface of the substrate 210A.

The first roller 300 may be provided inside the case 100 to be capable of rotating. The first roller 300 may include a first roller body portion 310 and a first insulating portion 320 that encompasses the first roller body portion 310 and is formed of an insulating material such as polyurethane and polyethylene terephthalate (PET). In particular, the first insulating portion 320 may exhibit elasticity or compressibility.

The first roller 300 may wind the display portion 200. The first roller 300 may wind the dummy portion 200B. In particular, an end portion of the dummy portion 200B is inserted into the first roller body portion 310 so as to fix the dummy portion 200B.

The guide portion 400 may be arranged inside the case 100. The guide portion 400 may include one or more guide gear portions that guide the display portion 200 during a movement of the display portion 200. In detail, the guide portion 400 may include a first guide gear portion 400A and a second guide gear portion 400B. The first guide gear portion 400A and the second guide gear portion 400B may radially bend the display portion 200 at least one time. Accordingly, the guide portion 400 may store the display portion 200 inside the case 100 in a minimum space. Also, the guide portion 400 may radially bend a path of the display portion 200 such that the panel portion 200A of the display portion 200 does not contact each other, wherein the dummy portion 200B is rolled upon roller first 300, and the panel portion is wound through the guide portion 400.

Also, the first guide gear portion 400A and the second guide gear portion 400B may be arranged to be misaligned (in a first direction) with each other. In particular, the first guide gear portion 400A and the second guide gear portion 400B may be alternately arranged inside the case 100.

The first guide gear portion 400A and the second guide gear portion 400B may be arranged at different positions. For example, the second guide gear portion 400B may be arranged closer to first roller 300 than the first guide gear portion 400A, and the first guide gear portion 400A may be arranged closer to the opening portion 110 than the second guide gear portion 400B. In other words, a distance between the second guide gear portion 400B and the opening portion 110 may be greater than a distance between the first guide gear portion 400A and the opening portion 110.

The first guide gear portion 400A and the second guide gear portion 400B are arranged to be parallel (in a second direction perpendicular to the first direction) and at different heights with each other. In detail, the first guide gear portion 400A may be arranged at a position lower than the second guide gear portion 400B. In particular, the first guide gear portion 400A and the second guide gear portion 400B may be arranged to be separated from each other in an oblique direction.

Referring to FIG. 3, the first guide gear portion 400A and the second guide gear portion 400B may be formed to be identical or similar to each other. A guide gear portion will now be explained in further detail with respect to a single guide gear portion, such as second guide gear portion 400B, for convenience of explanation.

The second guide gear portion 400B may include a first gear 410A, a rotary shaft 420 and a second gear 410B, wherein the first gear 410A is disposed on one end of the rotary shaft 420 and the second gear 410B is disposed at a second end of the rotary shaft 420. The first gear 410A and the second gear 410B that are arranged at opposite lateral sides of the display portion 200.

A plurality of insertion holes 210 (FIG. 1), or insertion grooves (not shown), are provided at the lateral sides of the display portion 200 into which a gear tooth of the first gear 410A is inserted. These insertion holes 210 have the same spacing as the teeth on each gear. It is preferred that the insertion holes 210 are disposed on opposite lateral sides of the display portion 200, however, they may be formed at one lateral side of the display portion 200.

The insertion holes 210 may be formed at a variety of positions in the display portion 200. For example, the insertion hole 210 may be formed only in the protection film P (FIG. 5). The protection film P may be formed to completely cover one surface of the substrate 210A, and may exist even in a portion where the substrate 210A does not exist. In this case, the insertion hole 210 may penetrate the protection film P entirely, as shown. Also, the insertion hole 210 may be formed in both the protection film P and the substrate 210A. In this case, the insertion hole 210 may penetrate the protection film P and the substrate 210A, as shown, or an insertion groove (not shown) may pass through the protection film P and be formed in the substrate 210A. In detail, when the insertion hole 210 is formed, the insertion hole 210 may be formed by penetrating through the substrate 210A and the protection film P. Also, when the insertion groove is formed, the insertion groove may be formed to be inserted in the substrate 210A or in the protection film P and a part of the substrate 210A. In the following description, a case in which the insertion hole 210 is formed in the substrate 210A and the protection film P is mainly discussed for convenience of explanation.

The second roller 600, like the first roller 300, may include a second roller body portion 610, and a second insulating portion 620 that encompasses the outside of the second roller body portion 610. The second roller 600 may be disposed in the case 100 to be close to the opening portion 110. In particular, the second roller 600 may not only maintain a tension force of the display portion 200 but also maintain the path of the display portion 200 to be flat.

The elastic portion 700 may be provided at the first roller 300. The elastic portion 700 may include a coiled spring, such as a spiral torsion spring, that is fixed to the first roller body portion 310 and the case 100. Also, the elastic portion 700 may include an elastic material such as rubber that provides a restoration force in a direction opposite to a rotational direction of the first roller body portion 310 during the release of the display portion 200.

Referring further to FIG. 3, the display apparatus 10 may include a position fixing portion 900 that fixes the extended length of the support portion 800. In this case, the position fixing portion 900 is formed in a ball plunger shape or a protrusion shape. When the length of the support portion 800 is extended to the maximum, the position fixing portion 900 may fix the length of the support portion 800. Also, when a user applies a force to the display portion 200, the position fixing portion 900 may remove the fixing of the support portion 800 enabling the display portion 200 to be retracted.

In addition to the above case, the position fixing portion 900 may fix the support portion 800 or may remove the fixing of the support portion 800 in response to an external signal. In this case, the position fixing portion 900 may include, although not shown, a motor and a frame and makes the frame contact the support portion 800 having a variable length, thereby fixing the support portion 800.

The position fixing portion 900 is not limited to the above description and may include all apparatuses and structures that may fix the support portion 800 at a desired length.

The support portion 800 may be provided to be inserted into the case 100 via opening portion 110. The support portion 800 may have a structure with a variable length. In particular, when the display portion 200 is drawn from or inserted into the case 100, the length of the support portion 800 varies so as to fix the display portion 200 or be inserted into the case 100 with the display portion 200.

Referring to FIG. 4A, the support portion 800 may be formed to have a variety of shapes. For example, the support portion 800 may include a frame 810 that does not cross another frame and a support bar 820 that is coupled to the frame 810 to help the frame slide. The frame 810 and the support bar 820 may be connected to each other, via a pin 822, or bolt, to be capable of simultaneously rotating and sliding. A groove 824 is provided in the support bar 820 to allow the frame 810 to fold and the pin 822 to slide along groove 824 and thus the length of the support portion 800 may vary. Also, each end portion of the frame 810 may be rotatably connected to the case 100 and the handle portion 500.

In another exemplary embodiment, as illustrated in FIG. 4B, a support portion 800' may be formed as a sliding rail type. A part of a rail 830 is fixed on the case 100 and another part of the rail is drawn from the part of the rail that is fixed on the case 100. For example, the support portion 800' may include a plurality of rails 830 having different sized diameters and thus each of the rails 830 may be telescopically extended or withdrawn.

As illustrated in FIG. 4C, in another exemplary embodiment, the length of the support portion 800" may vary as the frames 840 are connected in a scissoring manner to be expandable. In this case, a portion between the frames 840 that are connected to each other may be rotatable about a pin 842, or bolt. In particular, the frames 840 may cross each other at center portions thereof and end portions of the one frame 840 may be connected to another frame, thereby preventing interference with each other.

In another exemplary embodiment, not shown, the support portion may be formed in a plate having multiple foldable pleats. In this case, when the display portion is drawn from the case, the support portion may be unfolded to form a flattened surface. When the display portion is inserted into the case, the support portion may be folded up in such a manner that folded pleats contact each other.

Referring to FIG. 5, the panel portion 200A may include the substrate 210A, a display unit comprising a organic light-emitting device (OLED) 280A formed on the substrate 210A, and a thin film encapsulation layer E formed on the display unit. Also, the panel portion 200A may include the protection film P that is provided on at least one of a rear surface of the substrate 210A and an upper surface of the thin film encapsulation layer E.

The substrate 210A may connect the dummy portion 200B and the panel portion 200A. The substrate 210A may be formed of a plastic material or polyimide (PI). In the following description, a case in which the substrate 210A is formed of polyimide is mainly discussed for convenience of explanation.

The display unit may be formed on the substrate 210A. The display unit includes a thin film transistor (TFT). A passivation layer 270A is formed to cover the TFT. The organic light-emitting device (OLED) 280A may be formed on the passivation layer 270A.

A buffer layer 220A that is formed of an organic compound and/or an inorganic compound, for example, SiOx (x=1) or SiNx (x=1), may be further formed on the substrate 210A.

After an active layer 230A is formed in a predetermined pattern on the buffer layer 220A, the active layer 230A is buried by a gate insulating layer 240A. The active layer 230A may further include a source region 231A and a drain region 233A, and a channel region 232A is provided between the source region 231A and the drain region 233A.

The active layer 230A may include a variety of materials. For example, the active layer 230A may include an inorganic semiconductor material such as amorphous silicon or crystalline silicon. In another example, the active layer 230A may include oxide semiconductor. In another example, the active layer 230A may include an organic semiconductor material. However, in the following description, a case in which the active layer 230A is formed of amorphous silicon is mainly discussed for convenience of explanation.

The active layer 230A may be formed by forming an amorphous silicon layer on the buffer layer 220A, crystallizing the amorphous silicon into a polycrystalline silicon layer, and patterning the polycrystalline silicon layer. The source region 231A and the drain region 233A of the active layer 230A are doped with impurities according to a TFT type such as a driving transistor or a switching transistor.

A gate electrode 250A corresponding to the active layer 230A and an interlayer insulating layer 260A that buries the gate electrode 250A are formed on an upper surface of the gate insulating layer 240A.

After a contact hole H1 is formed in the interlayer insulating layer 260A and the gate insulating layer 240A, a source electrode 271A and a drain electrode 272A are formed on the interlayer insulating layer 260A to respectively contact the source region 231A and the drain region 233A.

The passivation layer 270A is formed above the TFT that is formed as described above, and a pixel electrode 281A of the OLED 280A is formed on the passivation layer 270A. The pixel electrode 281A contacts the drain electrode 272A of the TFT by a via hole H2 formed in the passivation layer 270A. The passivation layer 270A may be formed of an inorganic material and/or an organic material, or in a monolayer or in two or more layers. Also, the passivation layer 270A may be formed to be a planarization layer in order to planarize an upper surface regardless of unevenness of an underlayer, or to be uneven according to the unevenness of the underlayer. The passivation layer 270A may be formed of a transparent insulating material to achieve a resonance effect.

After the pixel electrode 281A is formed on the passivation layer 270A, a pixel define layer 290A is formed of an organic material and/or an inorganic material to cover the pixel electrode 281A and the passivation layer 270A, and is opened so as to have the pixel electrode 281A exposed.

An interlayer 282A and the opposite electrode 283A are formed at least on the pixel electrode 281A.

The pixel electrode 281A functions as an anode electrode and the opposite electrode 283A functions as a cathode electrode. The polarities of the pixel electrode 281A and the opposite electrode 283A are reversible.

The pixel electrode 281A and the opposite electrode 283A are insulated from each other by the interlayer 282A. Light is emitted from an organic light-emitting layer by applying voltages of different polarities to the interlayer 282A.

The interlayer 282A may include the organic light-emitting layer. In another optional example, the interlayer 282A may include the organic light-emitting layer and further at least one of a hole injection layer, a hole transport layer, an electron transport layer, and an electron injection layer on the organic light-emitting layer.

A unit pixel includes a plurality of sub-pixels that may emit lights of a variety of colors. For example, the sub-pixels may include sub-pixels that emit red, green, and blue lights, or sub-pixels that emit red, green, blue, and white lights.

The thin film encapsulation layer E may include a plurality of inorganic layers, or an inorganic layer and an organic layer.

The organic layer of the thin film encapsulation layer E may be formed of polymer, particularly, a monolayer or a stacked layer that is formed of any one of polyethylene terephthalate, polyimide, polar carbonate, epoxy, polyethylene, and polyacrylate. The organic layer may be formed of polyacrylate. For example, the organic layer may include a polymerized monomer composition including diacrylate-based monomer and triacrylate-based monomer. The monomer composition may further include monoacrylate-based monomer. In an exemplary embodiment, the monomer composition may further include a suitable photo initiator, e.g., trimethyl benzoyl diphenyl phosphine oxide (TPO).

The inorganic layer of the thin film encapsulation layer E may be a monolayer or a stacked layer including a metal oxide or a metal nitride. In detail, the inorganic layer may include any one of SiNx, Al2O3, SiO2, and TiO2.

A top layer of the thin film encapsulation layer E that is exposed to the outside may be formed in an inorganic layer in order to prevent intrusion of moisture into the organic light-emitting device 280A.

In an exemplary embodiment, the thin film encapsulation layer E may include at least one sandwich structure in which at least one organic layer is inserted between at least two inorganic layers. In an exemplary embodiment, the thin film encapsulation layer E may include at least one sandwich structure in which at least one inorganic layer is inserted between at least two organic layers. In an exemplary embodiment, the thin film encapsulation layer E may include a sandwich structure in which at least one organic layer is inserted between at least two inorganic layers and a sandwich structure in which at least one inorganic layer is inserted between at least two organic layers.

The thin film encapsulation layer E may include, although not shown, sequentially from an upper portion of the OLED 280A, a first inorganic layer, a first organic layer, and a second inorganic layer.

In another example, the thin film encapsulation layer E may include, sequentially from the upper portion of the OLED 280A, a first inorganic layer, a first organic layer, a second inorganic layer, a second organic layer, and a third inorganic layer.

Also, in another example, the thin film encapsulation layer E may include, although not shown, sequentially from the upper portion of the OLED 280A, a first inorganic layer, a first organic layer, a second inorganic layer, a second organic layer, a third inorganic layer, a third organic layer, and a fourth inorganic layer.

A halogenated metal layer (not shown) including LiF may be additionally included between the OLED 280A and the first inorganic layer. The halogenated metal layer may prevent the OLED 280A from being damaged when the first inorganic layer is formed by a sputtering method.

The first organic layer may have a size that is smaller than that of the second inorganic layer. The second organic layer may have a size that is smaller than that of the third inorganic layer.

The protection film P may be formed in a variety of shapes. For example, the protection film P may include, although not shown, a polarized film, a release film, and a reflective film. The protection film P may be attached on a rear surface of the substrate 210A. The rear surface of the substrate 210A may be defined to be a surface where the display unit is not formed. Also, the protection film P may be attached on an upper surface of the substrate 210A. The upper surface of the substrate 210A may be defined to be a surface where the display unit is formed. When the protection film P is attached on the upper surface of the substrate 210A, the protection film P may be attached on the thin film encapsulation layer E and the upper surface of the substrate 210A to completely shield the thin film encapsulation layer E. The protection film P may prevent the display portion 200 from an external force or scratches.

In the following description, a method of operating the display apparatus 10 is described in detail.

Figure 6:
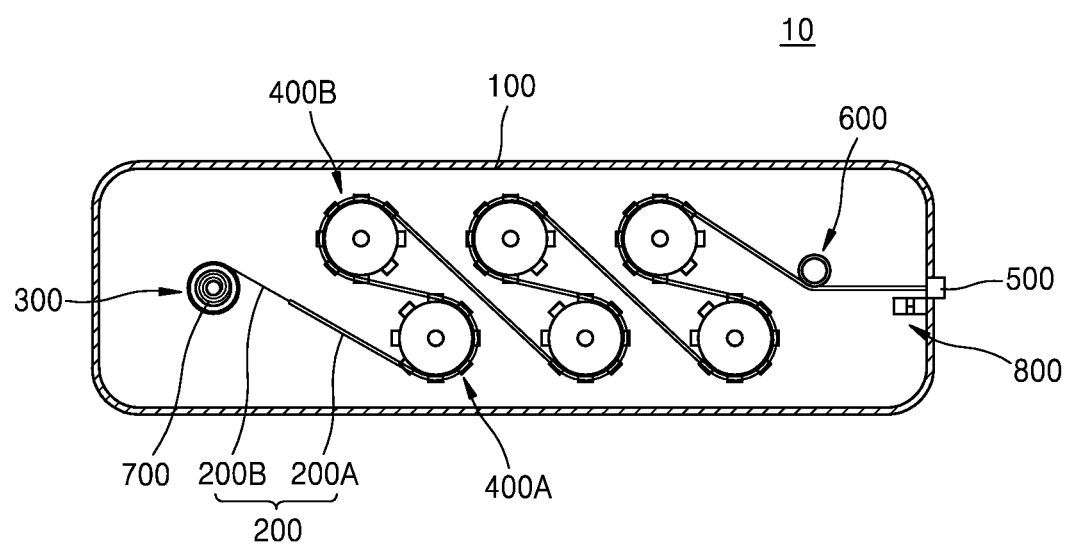
FIG. 6 is a conceptual view illustrating a first operation of the display apparatus of FIG. 1.
Figure 7:
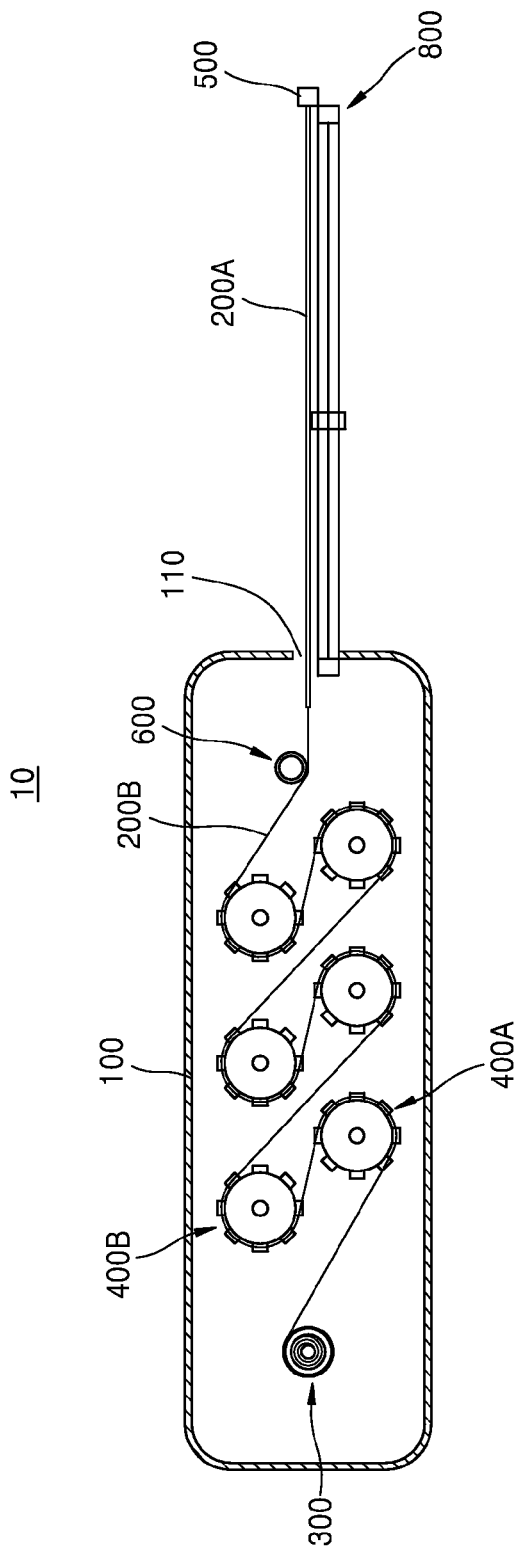
FIG. 7 is a conceptual view illustrating a second operation of the display apparatus of FIG. 1.

FIG. 6 is a conceptual view illustrating a first operation of the display apparatus of FIG. 1. FIG. 7 is a conceptual view illustrating a second operation of the display apparatus of FIG. 1.

Referring to FIGS. 6 and 7, when the display apparatus 10 is operated, a user using handle 500, may draw the display portion 200 from the case 100 to the outside or may insert the display portion 200 into the case 100 from the outside.

First, when the display portion 200 is drawn from the case 100 to the outside, a user may hold the handle portion 500 and apply a force to the handle portion 500 to pull the handle portion 500 to be separated from the case 100, the display portion 200 may be drawn with the handle portion 500 from the case 100 to the outside.

In this case, the panel portion 200A may be drawn from the case 100 to the outside, and the dummy portion 200B may be released from the first roller 300. Also, a part of the panel portion 200A and a part of the dummy portion 200B may be guided by the first guide gear portion 400A to the second guide gear portion 400B.

As such, when the handle portion 500 is continuously pulled, the dummy portion 200B may be bent into a loop by the first guide gear portion 400A that is closest to the first roller 300 and then bent again into another loop by the second guide gear portion 400B. Thereafter, the dummy portion 200B may be bent again by the next guide gear portion 400A and then bent again by the next guide gear portion 400B. Thus, the dummy portion 200B may be moved toward the second roller 600 through the above looping path.

When the handle portion 500 is moved as above, the length of the support portion 800 may increase. In this case, the length of the support portion 800 may be the same as a movement distance of the handle portion 500.

When the panel portion 200A is completely drawn from the case 100 through the handle portion 500, the dummy portion 200B may remain in the case 100. Also, the length of the support portion 800 may be the maximum. In this case, as the position fixing portion 900 (FIG. 3) fixes the support portion 800 in the extended position, the display portion 200 may be prevented from being retracted into the case 100 by a restoration force of the elastic portion 700.

In contrast, by manipulating the position fixing portion 900 the fixing of the support portion 800 may be released and the panel portion 200A may be retracted into the case 100. In this state, the first roller 300 may be rotated by the restoration force applied by the elastic portion 700 to the first roller 300 and the dummy portion 200B may be rewound around the first roller 300 due to the rotation of the first roller 300. In this state, the dummy portion 200B and the panel portion 200A may be guided by each guide gear portion 400B and 400A. In particular, the gear teeth of each gear 410A and 410B are inserted into the insertion holes 210 in each lateral side of the display portion 200 and thus the display portion 200 may be prevented from being deviated from a movement path during the movement of the display portion 200.

When the display portion 200 is completely inserted into the case 100 as described above, the dummy portion 200B may be completely wound around the first roller 300 and the panel portion 200A may be arranged in a state of being bent over the various guide gear portions 400A and 400B. Also, the handle portion 500 may be returned to an initial position by completely closing the opening portion 110 of the case 100.

Accordingly, since the panel portion 200A is not overlapped and in contact with itself inside the case 100, the display apparatus 10 may reduce damage due to a frictional force applied to the panel portion 200A. Also, the display apparatus 10 may prevent damage to the panel portion 200A due to particles adhering to the panel portion 200A when the panel portion 200A is drawn to the outside.

The display apparatus 10 may reduce static stress occurring when the panel portion 200A is wound in one direction by radially bending the panel portion 200A in different directions not one direction.

Figure 8:
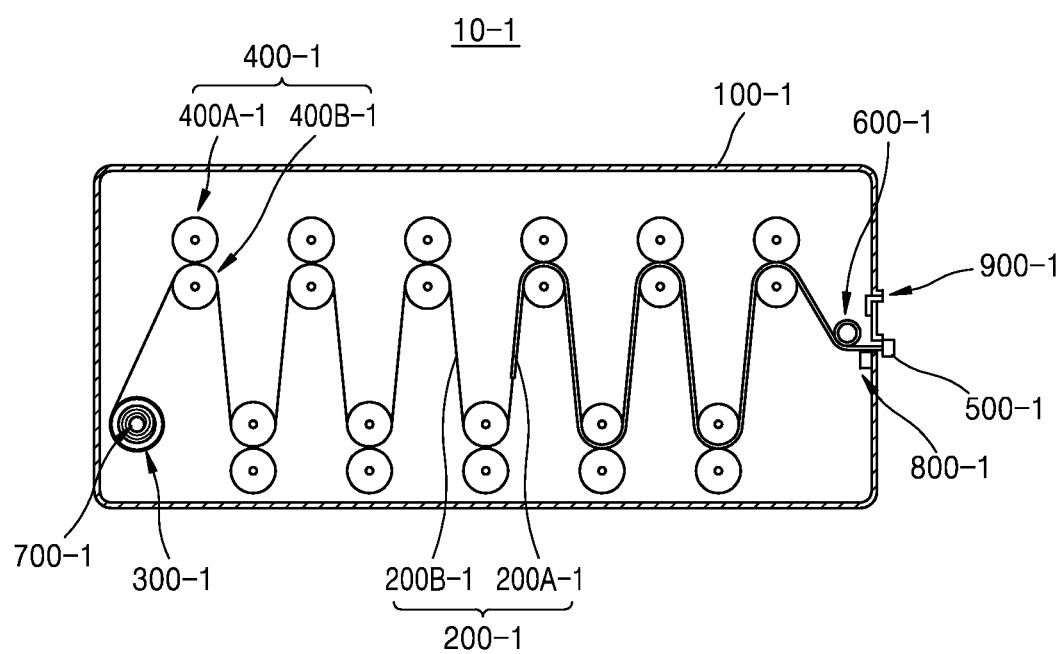
FIG. 8 is a cross-sectional view of a display apparatus according to another exemplary embodiment.
Figure 9:
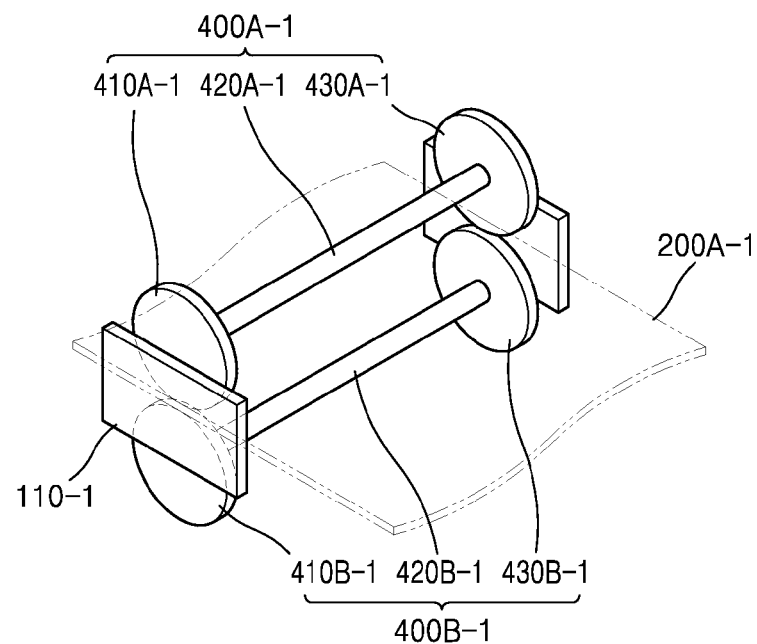
FIG. 9 is a perspective view illustrating a guide roller portion of FIG. 8.
Figure 10:
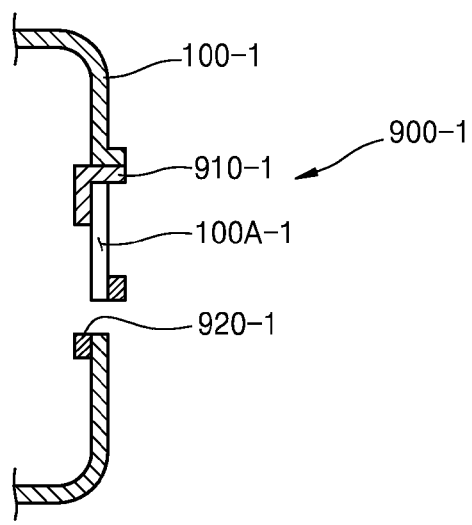
FIG. 10 is a cross-sectional view illustrating a position fixing portion of FIG. 8.

FIG. 8 is a cross-sectional view of a display apparatus 10-1 according to another exemplary embodiment. FIG. 9 is a perspective view illustrating a guide roller portion of FIG. 8. FIG. 10 is a cross-sectional view illustrating a position fixing portion of FIG. 8.

Referring to FIGS. 8 to 10, the display apparatus 10-1 may include a case 100-1, a display portion 200-1 including a panel portion 200A-1 and a dummy portion 200B-1, a first roller 300-1, a guide portion 400-1, a handle portion 500-1, a second roller 600-1, an elastic portion 700-1, a support portion 800-1, and a position fixing portion 900-1.

Since the case 100-1, the display portion 200-1, the first roller 300-1, the handle portion 500-1, the second roller 600-1, the elastic portion 700-1, and the support portion 800-1 are the same as or similar to those described in the above exemplary embodiment, detailed descriptions thereof are omitted.

The guide portion 400-1 may include a guide roller portion that assists transfer of the display portion 200-1 during the transfer of the display portion 200-1. The guide roller portion may contact at least a part of the display portion 200-1.

The guide roller portion may include a first guide roller portion 400A-1 and a second guide roller portion 400B-1, which are arranged to face each other in a pinch roller style. The display portion 200-1 may be arranged between the first guide roller portion 400A-1 and the second guide roller portion 400B-1.

The first guide roller portion 400A-1 and the second guide roller portion 400B-1 may be formed to be identical to or similar to each other.

In the following description of FIG. 9, the first guide roller portion 400A-1 is mainly discussed for convenience of explanation.

The first guide roller portion 400A-1 may include a first guide roller 410A-1 and a second guide roller 430A-1, which are arranged to face each other. Also, the first guide roller portion 400A-1 may include a first rotary shaft 420A-1 that connects the first guide roller 410A-1 and the second guide roller 430A-1.

The first guide roller 410A-1 and the second guide roller 430A-1 may contact opposite lateral sides of the display portion 200A-1. Also, the first rotary shaft 420A-1 may not contact the display portion 200-1.

The second guide roller portion 400B-1, similar to the first guide roller portion 400A-1, may include a third guide roller 410B-1, a second rotary shaft 420B-1, and a fourth guide roller 430B-1. The third guide roller 410B-1 may be arranged to correspond to the first guide roller 410A-1, and the fourth guide roller 430B-1 may be arranged to correspond to the second guide roller 430A-1. In particular, the first guide roller 410A-1 and the third guide roller 410B-1 may be arranged to support one lateral side of the display portion 200-1. Also, the second guide roller 430A-1 and the fourth guide roller 430B-1 may be arranged to support the other lateral side of the display portion 200-1. In this state, the display portion 200-1 may be moved by being inserted between the first and third guide rollers 410A-1 and 410B-1 and between the second and fourth guide rollers 430A-1 and 430B-1.

Referring again to FIG. 8, the first guide roller portion 400A-1 and the second guide roller portion 400B-1 each may be provided in a multiple number. The first guide roller portions 400A-1 and the second guide roller portions 400B-1 may be arranged to correspond to each other.

The first guide roller portions 400A-1 may be arranged to be separated from each other. The first guide roller portions 400A-1 may be arranged at different heights. In detail, some of the first guide roller portions 400A-1 may be arrange in an upper portion of the case 100-1, and the others of the first guide roller portion 400A-1 may be arranged in a lower portion of the case 100-1, in an alternating arrangement. Also, each second guide roller portion 400B-1 may be arranged to correspond to each first guide roller portion 400A-1.

In the above state, the display portion 200-1 may be kept in the case 100-1 by being bent (looped) by the first guide roller portion 400A-1 or the second guide roller portion 400B-1.

Referring again to FIG. 9, the display apparatus 10-1 may further include a separation prevention portion 110-1 that prevents the display portion 200-1 from being separated from the first guide roller portion 400A-1 and the second guide roller portion 400B-1 during the movement of the display portion 200-1. The separation prevention portion 110-1 may be provided at a lateral side of the first guide roller portion 400A-1 and the second guide roller portion 400B-1. In particular, the separation prevention portion 110-1 may be formed in a plate shape to be integrally formed with the case 100-1.

As shown in FIG. 10, the position fixing portion 900-1 may be provided in the case 100-1. The position fixing portion 900-1 may include a hook portion 920-1 that is fixed on the case 100-1 and a movable portion 910-1 that is slidably provided in the case 100-1.

A sliding hole 100A-1 into which the movable portion 910-1 is inserted to move may be formed in the case 100-1.

In the operation of the display apparatus 10-1, when a user holds the handle portion 500-1 and moves the handle portion 500-1, the display portion 200-1 may be drawn out of the case 100-1. The panel portion 200A-1 may be drawn out of the case 100-1, and the dummy portion 200B-1 that is wound around the first roller 300-1 may be released from the first roller 300-1. In particular, the dummy portion 200B-1 may be moved between the first guide roller portion 400A-1 and the second guide roller portion 400B-1.

When the extraction of the panel portion 200A-1 is completed, the movable portion 910-1 is moved close to the hook portion 920-1 and then the display portion 200 may be fixed through the movable portion 910-1 and the hook portion 920-1. The movable portion 910-1 may contact a boundary between the dummy portion 200B-1 and the panel portion 200A-1 to fix the display portion 200-1. Also, the support portion 800-1 may support the panel portion 200A-1 by being unfolded under a lower surface of the panel portion 200A-1 in response to movement of the handle portion 500-1.

When the fixing of the display portion 200-1 is completed, the panel portion 200A-1 is operated to perform an operation desired by a user. Then, when the using of the panel portion 200A-1 is completed, the panel portion 200A-1 may be inserted back into the case 100-1.

The elastic portion 700-1 may rotate the first roller 300-1 by providing a restoration force to the first roller 300-1. The dummy portion 200B-1 may be wound around the first roller 300-1 according to the rotation of the first roller 300-1. Also, as the panel portion 200A-1 is retracted into the case 100-1, the panel portion 200A-1 may be bent by the first guide roller portion 400A-1 or the second guide roller portion 400B-1.

Accordingly, the display apparatus 10-1 may store or draw the panel portion 200A-1 through a simple structure. Also, in the display apparatus 10-1, since the panel portion 200A-1 is not wound around the first roller 300-1, stress occurring when the panel portion 200A-1 is wound around the first roller 300-1 may be prevented.

In particular, in the display apparatus 10-1, since the panel portion 200A-1 is bent in different directions, the panel portion 200A-1 may be prevented from receiving excessive stress in one direction due to the radially bending of the panel portion 200A-1 in one direction.

Figure 11:
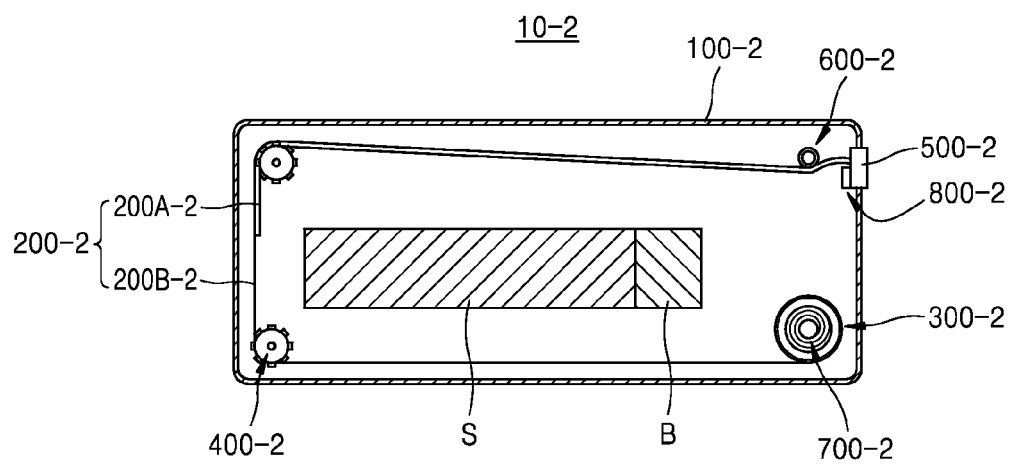
FIG. 11 is a cross-sectional view of a display apparatus according to another exemplary embodiment.

FIG. 11 is a cross-sectional view of a display apparatus 10-2 according to another exemplary embodiment.

Referring to FIG. 11, the display apparatus 10-2 may include a case 100-2, a display portion 200-2 including a panel portion 200A-2 and a dummy portion 200B-2, a first roller 300-2, a guide portion 400-2, a handle portion 500-2, a second roller 600-2, an elastic portion 700-2, a support portion 800-2, and a position fixing portion (not shown).

Since the case 100-2, the display portion 200-2, the first roller 300-2, the guide portion 400-2, the handle portion 500-2, the second roller 600-2, the elastic portion 700-2, the support portion 800-2, and the position fixing portion (not shown) are the same as or similar to those described above with reference to FIGS. 1 to 7, detailed descriptions thereof are omitted.

The guide portion 400-2 may be provided in a multiple number. The guide gear portions 400-2 may radially bend the display portion 200-2 along a path parallel to and adjacent the inner surface of the case 100-2. Also, each of the guide gear portions 400-2 may be connected to a part of the display portion 200-2 by teeth of multiple gears to guide the display portion 200-2 during the transfer of the display portion 200-2, as described above with reference to FIGS. 1 to 7.

The display apparatus 10-2 may include a secondary battery S inside the case 100-2. Also, the display apparatus 10-2 may include a circuit board B that is arranged inside the case 100-2. The display portion 200-2 that is bent as described above may secure a space for accommodating the secondary battery S and the circuit board B.

The operation of the display apparatus 10-2 may be similar to that described above. In detail, when a user pulls the handle portion 500-2, the panel portion 200A-2 of the display portion 200-2 and a part of the support portion 800-2 may be drawn to the outside. In this state, the dummy portion 200B-2 of the display portion 200A-2 is released from the first roller 300-2 to move along path defined by the guide gear portions 400-2.

When the using of the panel portion 200A-2 is completed and the handle portion 500-2 is moved or a force applied to the handle portion 500-2 is removed, the elastic portion 700-2 may rotate the first roller 300-2 and the first roller 300-2 may rewind the dummy portion 200B-2. Accordingly, the panel portion 200A-2 may be retracted into the case 100-2.

When the first roller 300-2 rewinds all the dummy portion 200B-2, as described above, the panel portion 200A-2 may be kept inside the case 100-2 in a state of being bent by the guide gear portions 400-2. In this state, only the dummy portion 200B-2 may be wound around the first roller 300-2.

Accordingly, the display apparatus 10-2 may keep or draw the panel portion 200A-2 through a simple structure. Also, in the display apparatus 10-2, since the panel portion 200A-2 is not wound around the first roller 300-2, stress occurring when the panel portion 200A-2 is wound around the first roller 300-2 may be prevented.

In particular, in the display apparatus 10-2, since the panel portion 200A-2 is bent in different directions, the panel portion 200A-1 may be prevented from receiving excessive stress in one direction due to the radially bending of the panel portion 200A-2 in one direction.

Figure 12:
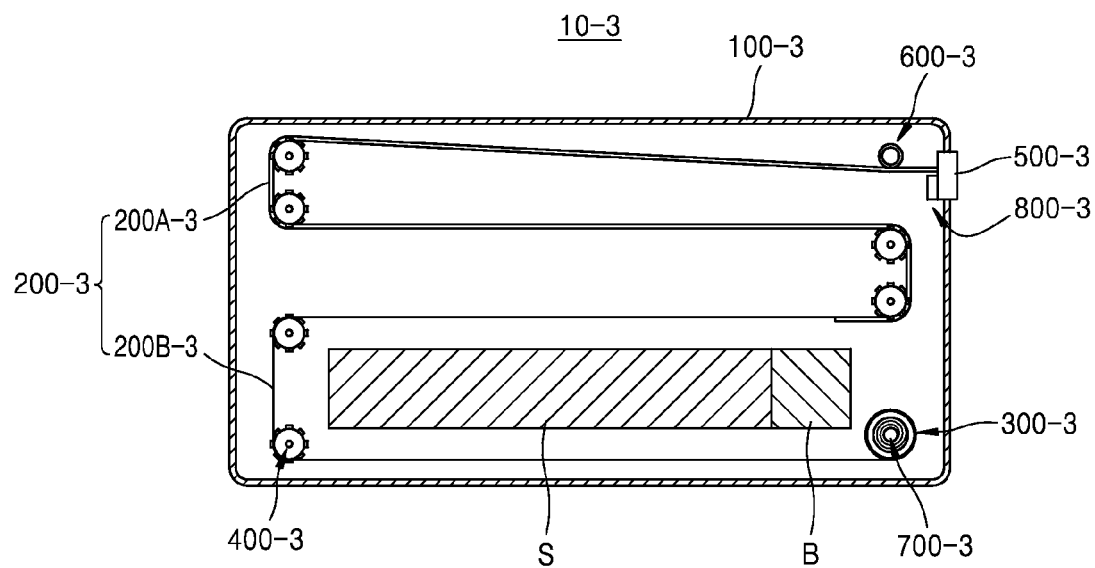
FIG. 12 is a cross-sectional view of a display apparatus according to another exemplary embodiment.

FIG. 12 is a cross-sectional view of a display apparatus 10-3 according to another exemplary embodiment.

Referring to FIG. 12, the display apparatus 10-3 may include a case 100-3, a display portion 200-3 including a panel portion 200A-3 and a dummy portion 200B-3, a first roller 300-3, a guide portion 400-3, a handle portion 500-3, a second roller 600-3, an elastic portion 700-3, a support portion 800-3, and a position fixing portion (not shown).

Since the case 100-3, the display portion 200-3, the first roller 300-3, the guide portion 400-3, the handle portion 500-3, the second roller 600-3, the elastic portion 700-3, the support portion 800-3, and the position fixing portion are the same as or similar to those described above with reference to FIGS. 1 to 7, detailed descriptions thereof are omitted.

The guide portion 400-3 may include a guide gears as described above with reference to FIGS. 1 to 7. The guide gear portion 400-3 may be provided in a multiple number. The guide gear portions 400-3 may radially bend the display portion 200-3 at least one time in a lengthwise direction of the case 100-3. In particular, the guide gear portions 400-3 may radially bend the display portion 200-3 in a lengthwise direction of the case 100-3 and in a height direction of the case 100-3. Also, each of the guide gear portions 400-3 may be connected to a part of the display portion 200-3 by teeth of the guide gears to guide the display portion 200-3 during the transfer of the display portion 200-3, as described above with reference to FIGS. 1 to 7.

The display apparatus 10-3 may include a secondary battery S inside the case 100-3. Also, the display apparatus 10-3 may include a circuit board B that is arranged inside the case 100-3. The display portion 200-3 that is bent as described above may secure a space for accommodating the secondary battery S and the circuit board B.

The operation of the display apparatus 10-3 may be similar to that described above. In detail, when a user pulls the handle portion 500-3, the panel portion 200A-3 of the display portion 200-3 and a part of the support portion 800-3 may be drawn to the outside. In this state, the dummy portion 200B-3 of the display portion 200-3 is released from the first roller 300-3 to move along the guide gear portions 400-3 in a rectangular zigzag path.

When the use of the panel portion 200A-3 is completed and the handle portion 500-3 is moved or a force applied to the handle portion 500-3 is removed, the elastic portion 700-3 may rotate the first roller 300-3 and the first roller 300-3 may rewind the dummy portion 200B-3. Accordingly, the panel portion 200A-3 may be retracted into the case 100-3.

When the first roller 300-3 winds all the dummy portion 200B-3, as described above, the panel portion 200A-3 may be kept inside the case 100-3 in a state of being bent by the guide gear portion 400-3. In this state, only the dummy portion 200B-3 may be wound around the first roller 300-3.

Accordingly, the display apparatus 10-3 may keep or draw the panel portion 200A-3 through a simple structure. Also, in the display apparatus 10-3, since the panel portion 200A-3 is not wound around the first roller 300-3, stress occurring when the panel portion 200A-3 is wound around the first roller 300-3 may be prevented.

In particular, in the display apparatus 10-3, since the panel portion 200A-3 is bent in different directions, the panel portion 200A-1 may be prevented from receiving excessive stress in one direction due to the radially bending of the panel portion 200A-3 in one direction.

As described above, according to the one or more of the above exemplary embodiments of the present inventive concept, the display apparatus may be easily carried.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present inventive concept have been described with reference to the figures, it will be understood by those of ordinary skill in the art that various changes in form and details may be made therein without departing from the spirit and scope of the present inventive concept as defined by the following claims.

What is claimed is:

1. A display apparatus comprising:
    a case having an opening portion formed therein;
    a first roller rotatably provided inside the case;
    a display portion provided on the first roller, the display portion being wound around the first roller and released from the first roller;
    a rotatable guide portion provided inside the case to guide the display portion by radially bending the display portion at least one time during a movement of the display portion, wherein the rotatable guide portion is provided in plurality and the plurality of rotatable guide portions are separated from each other and misaligned with respect to each other in a lengthwise direction of the case; and
    a second roller that is provided inside the case and adjacent to the opening portion and supports the display portion when the display portion is drawn from or inserted into the case,
    the display portion being fully enclosed by the case until extracted from the case.

2. The display apparatus of claim 1, further comprising a handle portion that is connected to an end portion of the display portion and opens and closes the opening portion of the case.

3. The display apparatus of claim 1, wherein the display portion comprises:
    a dummy portion that is connected to the first roller and is wound around or released from the first roller; and
    a panel portion that is connected to the dummy portion and is guided by the rotatable guide portion when drawn from or inserted into the case.

4. The display apparatus of claim 1, wherein the rotatable guide portion comprises a guide gear portion that is partially inserted into the display portion to guide the display portion during the movement of the display portion.

5. The display apparatus of claim 4, wherein the guide gear portion comprises:
    a first gear that is arranged at a lateral side of the display portion;
    a rotary shaft connected to the first gear; and
    a second gear that is arranged at an opposite lateral side of the display portion and is provided on the rotary shaft to face the first gear.

6. The display apparatus of claim 5, wherein an insertion groove or insertion hole into which at least one gear tooth of the first gear or the second gear is inserted is formed at at least one of the lateral sides of the display portion.

7. A display apparatus comprising:
    a case having an opening portion formed therein;
    a first roller rotatably provided inside the case;
    a display portion provided on the first roller, the display portion being wound around the first roller and released from the first roller;
    a rotatable guide portion provided inside the case to guide the display portion by radially bending the display portion at least one time during a movement of the display portion, wherein the rotatable guide portion is provided in a multiple number and the rotatable guide portions radially bend the display portion such that the display portion is parallel to a lengthwise direction of the case; and
    a second roller that is provided inside the case and adjacent to the opening portion and supports the display portion when the display portion is drawn from or inserted into the case.

8. The display apparatus of claim 7, wherein each of the rotatable guide portions comprises:
    a first rotatable guide portion that radially bends the display portion; and
    a second guide portion that is arranged at a more inner position in the case than the first rotatable guide portion with respect to a traveling direction of the display portion and radially bends the display portion.

9. The display apparatus of claim 8, wherein the first rotatable guide portion and the second rotatable guide portion are arranged at different heights inside the case.

10. The display apparatus of claim 7, wherein each rotatable guide portion is arranged at each corner of the case and radially bends the display portion along a path adjacent an inner surface of the case.

11. The display apparatus of claim 1, wherein the rotatable guide portion comprises a guide roller portion that contacts the display portion and guides the display portion during the movement of the display portion.

12. The display apparatus of claim 11, wherein the guide roller portion comprises:
    a first guide roller portion that contacts one surface of the display portion; and
    a second guide roller portion that is arranged adjacent the first guide roller portion and contacts an opposite surface of the display portion.

13. The display apparatus of claim 11, wherein the guide roller portion comprises:
    a first guide roller that is arranged at a lateral side of the display portion;

a rotary shaft that is connected at one end to the first guide roller; and a second guide roller that is arranged at an opposite lateral side of the display portion and is connected at an opposite end the rotary shaft to face the first guide roller.

14. The display apparatus of claim 1, wherein the display portion is flexible.

15. The display apparatus of claim 1, further comprising an elastic portion that is provided on the first roller to provide a restoration force to the first roller when the display portion is released.

16. The display apparatus of claim 1, further comprising a support portion, the support portion being inserted in or drawn from the case and supports a part of the display portion when the display portion is drawn from the case.

17. The display apparatus of claim 1, wherein the display portion comprises:
a substrate;
a display unit that is formed on the substrate;
a thin film encapsulation layer formed on the display unit; and
a protection film that is provided on at least one of a rear surface of the substrate and an upper surface of the thin film encapsulation layer.

18. The display apparatus of claim 1, wherein the first roller comprises:
a roller body portion; and
an insulating portion that is provided on an outer surface of the roller body portion and is formed of an insulating material.

19. A display apparatus comprising:
a case having an opening formed in one side thereof;
a first roller rotatably provided inside the case;
a flexible display, the flexible display having a panel portion and a dummy portion, the dummy portion being wound around the first roller during retraction of the panel portion or released from the first roller during extraction of the panel portion of the flexible display, the flexible display being fully enclosed by the case until the panel portion is extracted from the case;
a second roller provided inside the case and adjacent to the opening, the second roller supports the panel portion when the panel portion is drawn from or inserted into the case; and
a rotatable guide portion provided inside the case to guide the flexible display by radially bending the flexible display at least twice during a movement of the flexible display, wherein the rotatable guide portion comprises:
a first guide gear portion that radially bends the flexible display in a first direction; and
a second guide gear portion that radially bends the flexible display in a second direction different from the first direction.

20. The display apparatus of claim 19, further comprising a handle portion adjacent to and closing the opening in the case while the panel portion is inside the case, the handle being connected to an end portion of the panel portion and used to draw the panel portion outside the case.

21. The display apparatus of claim 19, wherein the first guide gear portion is disposed in a lower portion of the case and the second guide gear portion is arranged in an upper portion of the case, the first guide gear portion being disposed closer to the opening than the second guide gear portion.

* * * * *